United States Patent

[11] 3,633,889

[72] Inventors Erich Bade
Beckum;
Johannes Thelen, Bergisch Gladbech, both of Germany
[21] Appl. No. 4,603
[22] Filed Jan. 21, 1970
[45] Patented Jan. 11, 1972
[73] Assignee Walter & Cie Aktiengesellschaft
Cologne-Dellbruck, Germany

[54] COOLING ARRANGEMENT FOR THE PRODUCT OF ROTARY FURNACES
43 Claims, 9 Drawing Figs.
[52] U.S. Cl. ................................................. 263/32, 34/173
[51] Int. Cl. ........................................................ F27b 7/00
[50] Field of Search ............................................ 263/32; 34/173; 214/18 V

[56] References Cited
UNITED STATES PATENTS
1,581,522  4/1926  Stehmann .................. 263/32
1,303,527  5/1919  Wollaston ................... 214/18 V
1,690,048  10/1928  Bentley ...................... 263/32

Primary Examiner—John J. Camby
Attorney—Michael S. Striker

ABSTRACT: A rotary furnace serves for treating flowable solids and has an output through which the treated flowable solids issue at elevated temperature. A stationary upright cooling conduit receives in its upper portion the treated flowable solids from the furnace, and has a lower portion downwardly of the upper portion. Intercepting means is located in the lower portion for intercepting the treated flowable solids so that the same accumulate to form a substantially conical mound on the intercepting means in the cooling conduit. The solids forming this mound are discharged in downstream direction at a controlled rate by the intercepting means. The withdrawing means is downwardly spaced from the intercepting means and receives discharged treated solids and withdraws them from the cooling conduit. Supply means directs streams of cooling air upwardly through the accumulated intercepted treated solids from the region between the intercepting means and the withdrawing means.

INVENTOR
ERICH BADE
JOHANNES THEGEN

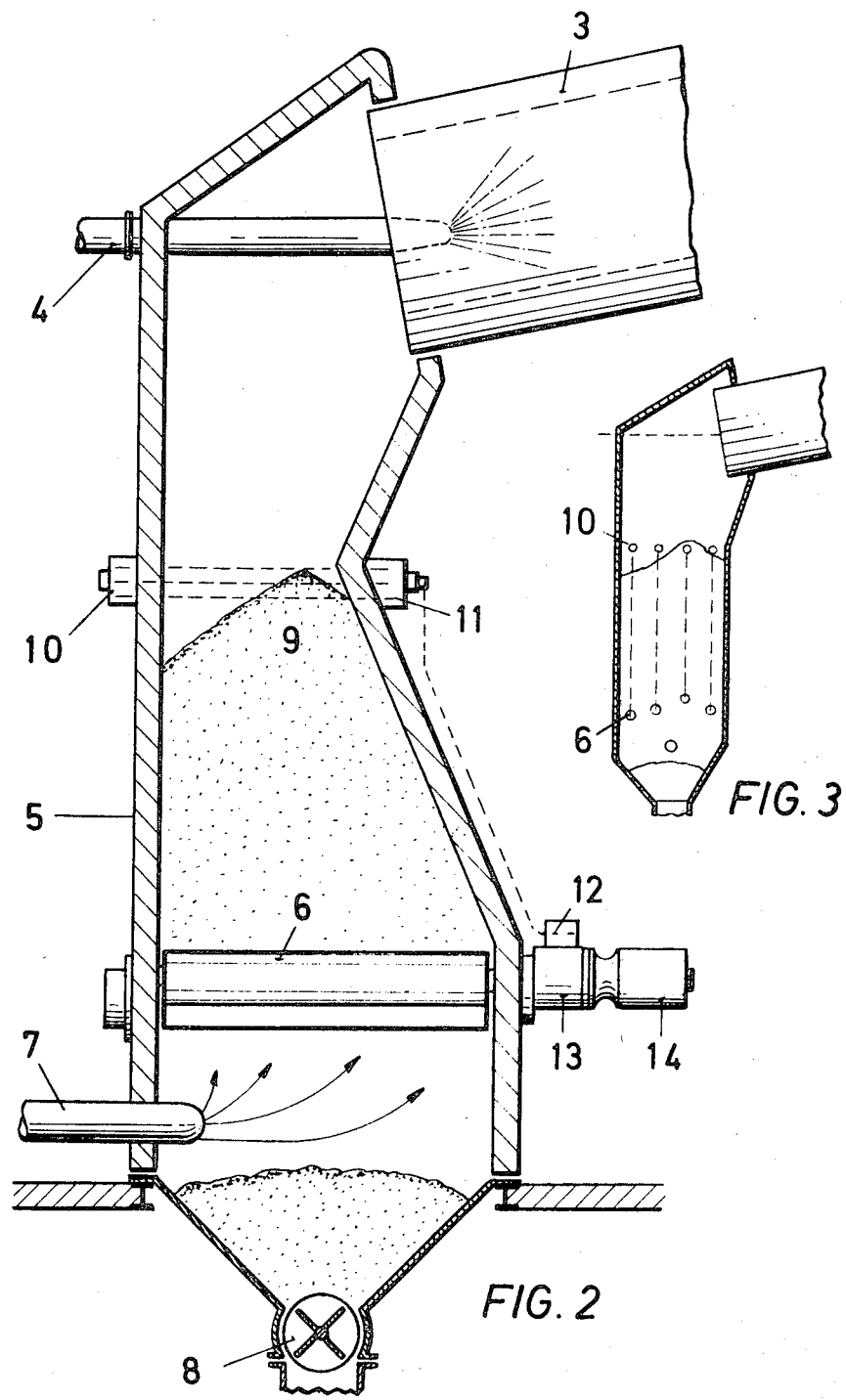

INVENTOR
ERICH BADE
JOHANNES THELEN

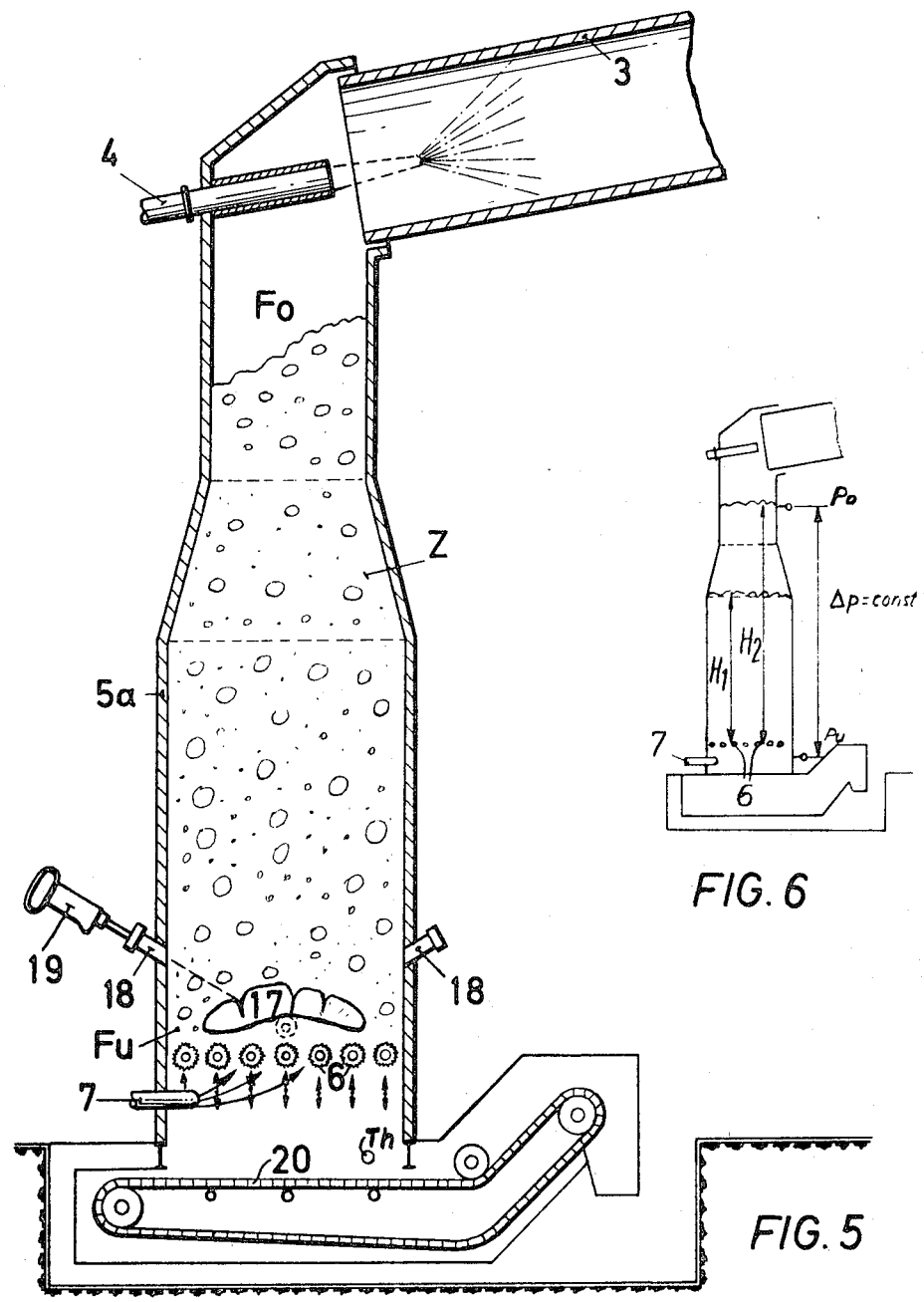

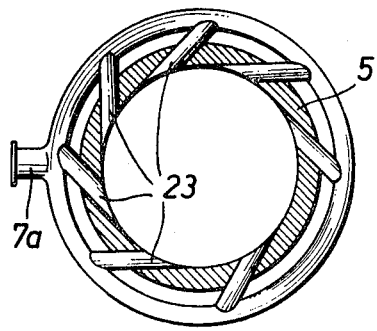
FIG. 8
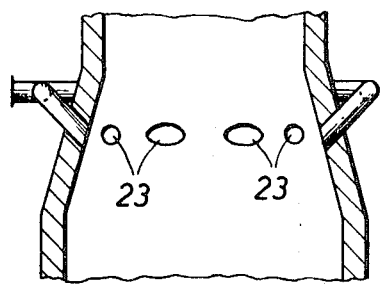
FIG. 9
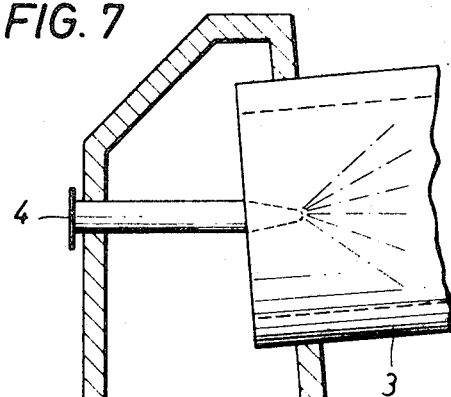
FIG. 7
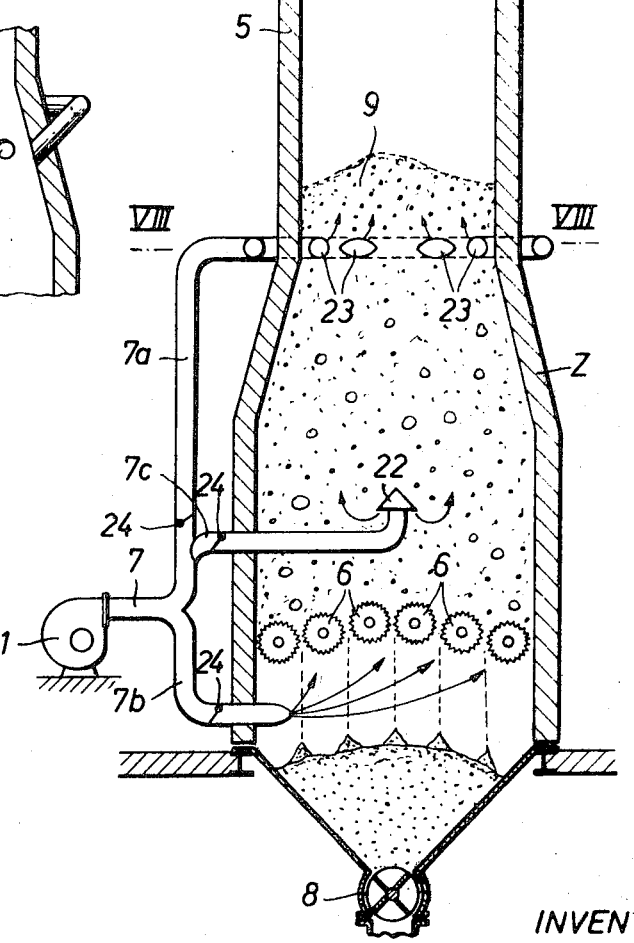
INVENTOR
ERICH BADE
JOHANNES THELEN 3,633,889

COOLING ARRANGEMENT FOR THE PRODUCT OF ROTARY FURNACES

BACKGROUND OF THE INVENTION

The present invention relates generally to a cooling arrangement for the product of furnaces, and more particularly to a cooling arrangement for the product of rotary furnaces. Still more specifically the invention relates to a cooling arrangement for the product of a rotary furnace used for the production of dolomite-clinker, magnesite-clinker, cement-clinker and the like.

It is already known to provide so-called feed coolers or traveling-grate coolers which cooperate with a rotary furnace to receive calcined material from the same, and on which the material is cooled by air supplied from below the coolers while it is being transported by the same. The cooling action is supplied by a stream of cooling air passing through a thin layer of material transversely to the direction of movement thereof, and this has been found to require relatively large cooling surfaces and a correspondingly large quantity of cooling air. Some of this air can be supplied to the rotary furnace as supplementary or secondary air. The remainder of the cooling air, and in fact usually the preponderance thereof, cannot be supplied to the rotary furnace and this portion of the air—which of course has been heated by contact with the calcined material which it has served to cool—may either be used in a further processing stage, for instance for drying or similar purpose, If this is not possible then it must be vented into the atmosphere after dust extraction. Evidently, if the air must be vented, as is frequently the case, the heat energy thus wasted constitutes a loss in terms of the calcining process.

It has therefore been proposed to rotate a vertical cooling conduit of circular cross section, and to arrange it beneath a rotary furnace to thereby maintain a uniform layer thickness in the cooling conduit to which the cooling air is supplied from below with a concomitant increase in the efficiency of heat exchange between the cooling air and the material being cooled. However, it has been found that in practice this type of arrangement has significant disadvantages. Clearly, a cooling conduit so constructed and arranged must sustain considerable weights and despite these weights must be rotated. This provides difficulties not only in structural terms but also in operational terms, particularly with respect to obtaining a proper seal between the rotary furnace and the cooling conduit. Such seal is necessary and must be reliable because even the existence of small leaks would allow substantial quantities of unwanted air to penetrate and thereby greater impair the sintering or calcining process which takes place in the rotary furnace. Thus, this solution has not been found to be satisfactory because it does not meet the requirements of industry.

SUMMARY OF THE INVENTION

It is, accordingly, an object of the present invention to provide an arrangement which is not subject to the aforementioned disadvantages.

More particularly it is an object of the present invention to provide such an arrangement which overcomes the aforementioned disadvantages.

Still more specifically the present invention has as one of its objects the provision of an arrangement of the type under discussion wherein improved heat exchange is obtained in the cooling air and the treated solids, and wherein the intrusion of unwanted air into the rotary furnace is avoided.

A further object of the invention is to provide such an arrangement which is relatively simple and therefore less subject to breakdown than would otherwise be the case.

A concomitant object of the invention is to provide such an arrangement which is capable of improving the utilization of perceptible heat retained in the treated calcined solids.

Still a further object of the invention is to provide such an arrangement which permits automating the throughput of calcined material through the cooling arrangement, and which permits ready clearing of any obstructions which may arise.

The invention is based on the recognition that it is necessary for the cooling conduit to be stationary, and at the same time that the cooling should be carried out purely by countercurrent flow of the cooling air to the calcined material issuing from the rotary furnace. The cooling conduit may have various different cross-sectional configurations which are advantageously so selected that the calcined treated solids to be cooled are kept, at least in the upper part of the cooling conduit adjacent the outlet of the rotary furnace, in flowable condition by means of the stream of cooling air, a circumstance which contributes to the improvement of convection heat transfer and, to some extent, brings about pneumatic dissolution of the mound of treated solids which forms in the cooling conduit.

In pursuance of the above objects, and others which will become apparent hereafter, one feature of the invention resides, briefly stated, in an arrangement of the character described which comprises a furnace for treating flowable solids and having an outlet through which the treated flowable solids issue at elevated temperature. A stationary upright cooling conduit is provided having a lower portion and an upper portion, with the latter being connected to the furnace and communicating to the outlet of the same for receiving treated flowable solids therefrom. Intercepting means is provided in the lower portion of the conduit for intercepting the treated flowable solids so that the same accumulate in the conduit above the intercepting means, and for discharging the intercepted treated solids in downstream direction at a controlled rate. Withdrawing means is spaced from the intercepting means in downstream direction and receives discharged treated solids which it withdraws from the cooling conduit. Supply means directs streams of cooling air upwardly through the accumulated intercepted treated solids from the region between the intercepting means and the withdrawing means.

The present invention provides for complete utilization of the heat content of the total amount of cooling air, either totally as combustion air for the flame of the rotary furnace or by diverting a part of the cooling air for use in another process. Thus, practically no heat loss arises and no air streams of varying temperatures will come into being, such as are found where grate coolers are used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a view somewhat similar to FIG. 1 but taken at right angles to the latter, illustrating the arrangement of the crushing rollers and of the means for effecting automatic regulation of the revolutions of the crushing rollers;

FIG. 3 is a diagrammatic elevation of FIG. 2;

FIG. 5 is a view somewhat similar to FIG. 4 but illustrating an embodiment including means for reducing large-dimensioned solid pieces which have issued from the furnace;

FIG. 6 is a diagrammatic illustration of the regulatory arrangement provided for obtaining constant air throughput;

FIG. 7 is a view somewhat similar to FIG. 1 illustrating the supply of cooling air below and above the crushing rollers;

FIG. 8 is a transverse section through the upper air intake in FIG. 7, taken on the line VIII—VIII of FIG. 7; and FIG. 9 is a longitudinal section through the region of the upper air intake in FIG. 7.

DESCRIPTION OF THE PREFERRED EMBODIMENTS

Figure 1:
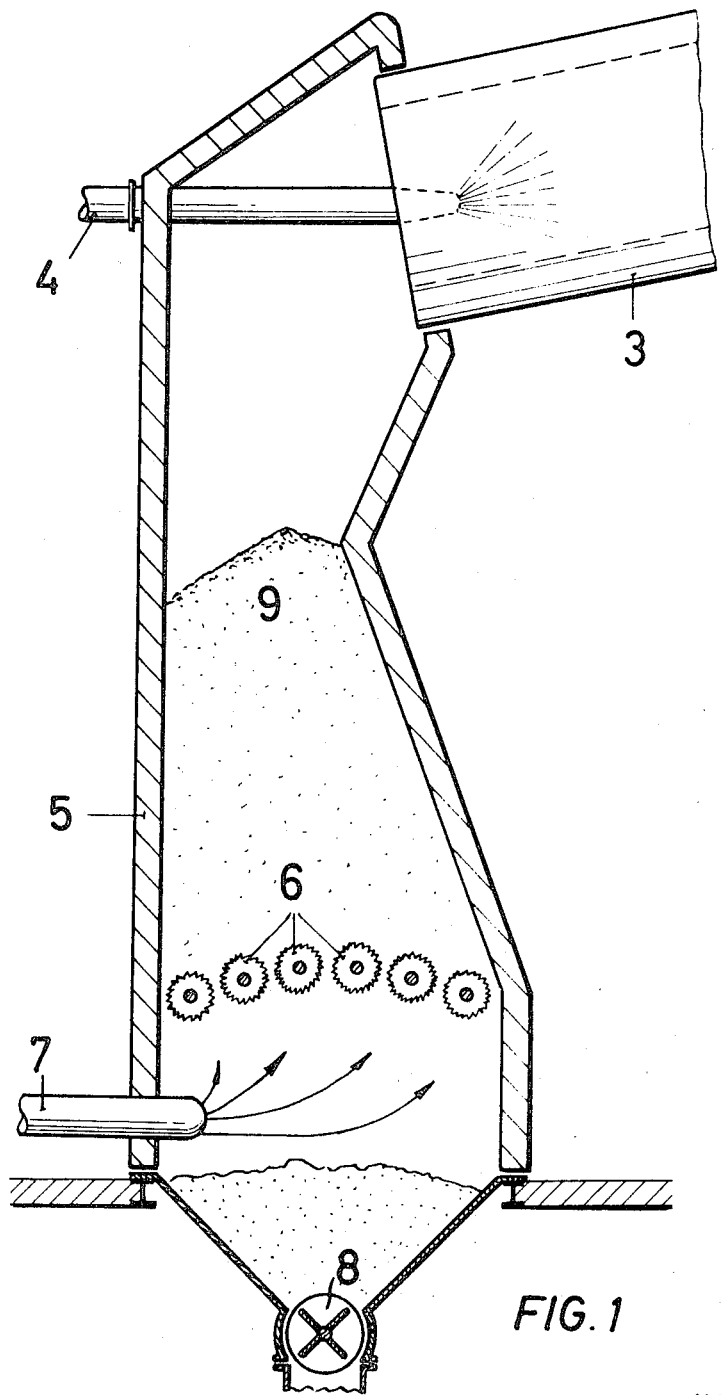
FIG. 1 is a somewhat diagrammatic vertical section illustrating the basic construction of an arrangement according to the present invention.

Discussing now the drawing in detail, and firstly FIG. 1 thereof, it will be seen that reference numeral 3 identifies an outlet portion of a rotary furnace of known construction, which is not identified or described in more detail because its particular construction is well known to those skilled in the art and does not, in any case, form a part of the present invention. A conventional burner tube 4 is provided cooperating with the output of the rotary furnace 3 in known manner.

Extending downwardly from the outlet of the rotary furnace 3 is an upright—usually vertical—cooling conduit 5 having an upper portion and a lower portion, in which latter there are arranged a plurality of axially parallel crushing rollers 6 of known construction, which are rotated slowly and whose bearings and drive means are advantageously located outside the conduit 5 to protect them against damage. Reference numeral 7 identifies supply means or an inlet conduit through which streams of cooling air—identified by the curved arrows—are introduced from below the crushing rollers 6 into the conduit 5, so that they rise through and between the crushing rollers 6 and will pass upward through the mound 9 of treated calcined solids which accumulates in the conduit 5 as the treated solids issue from the outlet opening of the rotary furnace 3. Thus, the cooling air issued from the conduit 7 serves to cool the rollers 6 as well as the material of the mound 9. It will be noted that the upper surface of the mount 9 is downwardly spaced from the outlet opening of the rotary furnace 3, which means that the air which has passed through the mound 9 can come into heat exchanging contact with the still divided particles of solids issuing from the outlet of the rotary furnace 3 while these particles fall through space from the outlet onto the mound 9, so that heat still retained in these particles—particularly during crushing of the larger pieces—is also recovered.

Suitable means, such as a bucket wheel 8 or nonillustrated double doors or flaps, is arranged downwardly below the conduit 7 so that the same discharges into the conduit 5 between the bucket wheel 8 and the crushing rollers 6. The bucket wheel 8 or the analogous means provided in its place serves to remove crushed, calcined and cooled material as it issues from between the crushing rollers 6.

According to the present invention it is essential that the substantially conical mound 9 has a certain height so selected that the cooling air from the conduit 7 passes evenly through the material of the mound 9 without causing the formation of air layers or currents of varying temperatures which would prevent uniform cooling of the material of the mound 9. For this purpose different possibilities exist, which may be employed singly or in combination. On the one hand the crushing rollers 6 may be arranged at staggered levels as illustrated in FIG. 1 with respect to the height of the mound 9. A further possibility is to rotate different ones of the crushing rollers 6 at different speeds. In particular, those of the crushing rollers 6 which are located below the distinctly conical portion of the accumulated mound 9 may be rotated faster than the remaining crushing rollers 6, whereby a portion of the cross section of the accumulated mound 9 is used preferentially for effecting reduction of the mound and discharging of the material thereof in downstream direction at a controlled rate.

Furthermore, the reduction of the mound 9 may be further encouraged by having the conduit 5 diverge in cross section area in downstream direction, that is downwardly as seen in FIG. 1. In fact, this not only facilitates preferential withdrawal of certain portions of the material making up the mound 9, but also these preferentially withdrawn portions in this manner will have the same dwell-time in the conduit 5 as the remainder of the material.

It is emphasized that the cross-sectional area of the conduit 5 adjacent the upper end thereof is so chosen that the smaller particles of the material issuing from the rotary furnace 3 will be maintained in flowable condition, that is at least in the region of the surface of the mound 9, a factor which further facilitates pneumatic dissolution of the mound 9.

The portion of the rotary furnace 3 which is shown in FIG. 1 is constructed in form of an inclined slide through which the material issuing from the interior of the rotary furnace 3 enters into the upper portion of the conduit 5. However, it is equally well possible to let the treated material fall freely from the rotary furnace into the inlet end of the conduit 5 without the provision of the inclined slide shown in FIG. 1. Further it is emphasized that while in the various embodiments the cooling conduit has always been shown in vertical orientation, it is possible to have it somewhat inclined within a certain range—for instance to approximately the vertical position of the one-sided conical mound 9—in which case allowance must of course be made to the fact that that wall portion of the conduit 5 on which the weight of the material of the mound 9 will predominantly rest, will be subjected to greater wear and tear.

With the construction according to the present invention, where a stationary cooling conduit 5 is connected with the rotary furnace 3, we obtain a rather strong sturdy construction and make it possible to locate the pivot bearings for the crushing rollers 6 outside the conduit 5 and thereby well protected, and in addition the cooling air may be readily regulated as is subsequently to be described. In consequence, the operating life of the entire installation is significantly increased.

It should be emphasized that in place of the crushing rollers 6 other means may be provided, for instance a substantially mushroom-shaped rotary grate of the like.

Where more intensive cooling effects are required, two units of the same type may be connected in series so that the substantially hotter air of the first unit or first stage may be supplied to the combustion process as combustion air, while the air of the second stage at lower temperature may be used for other purposes, or even partly for the first stage as primary air.

Under certain circumstances it may be desirable to withdraw a portion of the cooling air, for instance at a location halfway up the height of the mound 9, in order to assure that in the lower portion of the cooling conduit 5 a greater quantity of air is available for the already precooled solids while in the upper portion only that quantity of air will enter which is actually needed for combustion.

Furthermore, it is desirable to automate the passage of material through the cooling conduit 5. According to the present invention a number of radiation emitters and radiation receivers may be located oppositely one another on opposite sides of the cooling conduit 5, to sense the prevailing height of the mound 9. These receives may then be connected in suitable manner with the drive or drives for the rollers 6 to thereby vary the rate of revolutions of the rollers 6 in dependence upon the height of the mound 9 which has been sensed. Thus, if the path of radiation from an emitter to the associated receiver is interrupted because the height of the mound 9 increases and the latter rises in the conduit 5, then the speed of rotation of the associated crushing roller is increased until by faster removal of material in downstream direction the level of the mound 9 again descends in the conduit 5. Known isotope radiators may be used for the radiating emitting means desired.

An embodiment of a construction based on this concept is shown in FIGS. 2 and 3. Elements 3–9 correspond to those shown in FIG. 1 and identified with the identical reference numeral. In the embodiment of FIGS. 2 and 3, however, there are arranged one or more radiation emitters 10 at a certain level of the cooling conduit 5, with the single one or each one of the emitters 10 being associated with a receiver 11 located at least substantially in the same transverse plane as the emitter 10. Emitters 10 and receivers 11 are well known to those skilled in the art and need not be described in detail herein. Each receiver 11 is associated with an amplifier 12 which in turn acts on the speed regulator 13 of the motor 14 of one of the crushing rollers 6. The connection between the receiver 11 and the associated amplifier 12 is shown in dashed lines in FIG. 2. As the upper level of the mound 9 rises, it will eventually intercept the radiation emitted by the emitter 10 and prevent the radiation from entering the receiver 11. In response to this a signal will be generated by the receiver 11 which is amplified in the amplifier 12 and supplied by the same to the speed regulator 13 which then increases the speed of operation of the motor 14 and thereby of the associated crushing roller 6 until, in response to a faster withdrawal of material from the mound 9 by the crushing rollers 6, the level of the mound 9 will then fall below the direct line connecting the emitter 10 and the receiver 11.

It is also possible to arrange two transmitters and receivers in each instance at a distance one above the other, with the upper serving to increase the revolutions of the associated motor 14 and with the lower serving to reduce the revolutions, so that as the level of the mound 9 descends to such an extent that it falls below the direct line connecting the lower emitter 10 with the associated lower receiver 11, the signal generated by the latter will serve to reduce the number of revolutions of the motor 14 and the associated crushing roller 6. This is not illustrated in the drawing but will be readily understood by those skilled in the art. In such an arrangement the upper and lower emitter-receiver pairs 10, 11 then serve to define the upper and lower limit between which the height of the mound 9 may vary but above which it will not extend and below which it may not descend.

If desired the radiation emitted by the material of the mound 9 itself, that is heat radiation, may itself be used for effecting this type of control, simply by utilizing a receiver which is responsive to such heat radiation, analogous to the manner in which flame monitors are employed in oil-fired installations. This may be accomplished by utilizing photo conductive cells with suitable amplifiers.

FIG. 3, a diagrammatic side elevation of FIG. 2, illustrates the relation of the emitters 10 with reference to the staggered arrangement of the crushing rollers 6.

Figure 4:
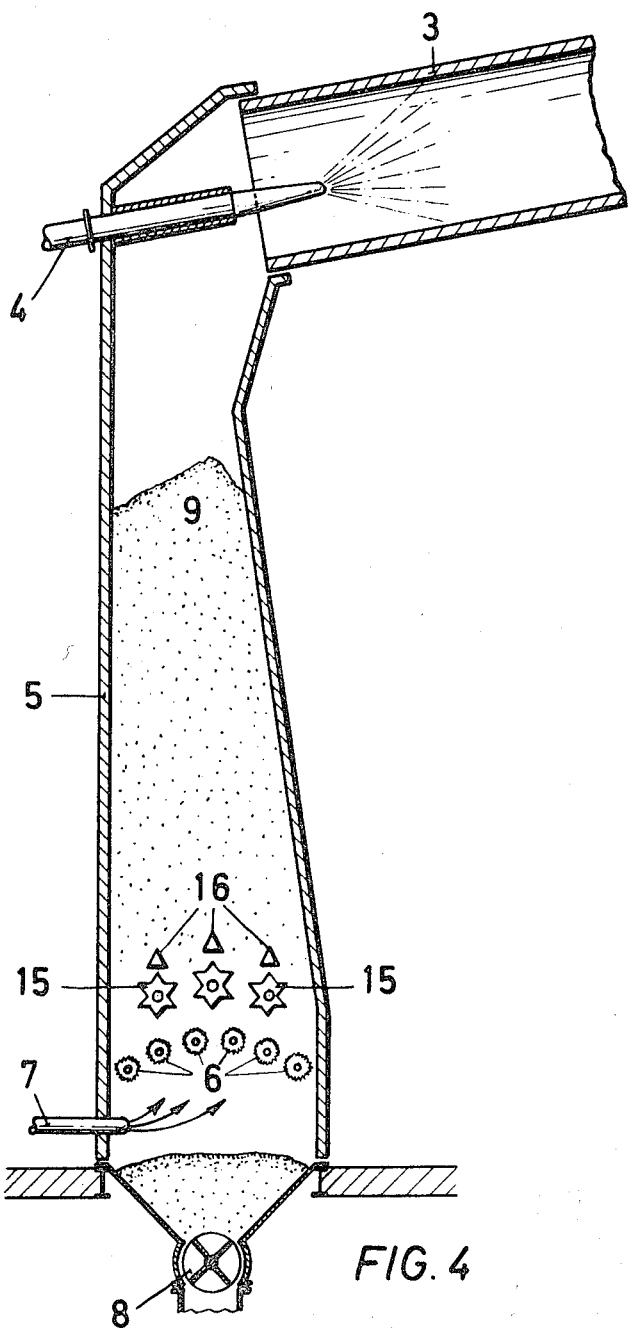
FIG. 4 is a view similar to FIG. 1 but illustrating a further embodiment of the invention wherein coarse-crushing rollers are arranged above the regular crushing rollers.

As shown in FIG. 4, it may be desired to arrange coarse-crushing rollers 15 above the crushing rollers 6. This will be necessary or desirable if the solid material issuing from the outlet of the rotary 3 consists in part of larger pieces which cannot be directly pulverized by the crushing rollers 6. In that case the provision of the coarse-crushing rollers 15 is advantageous because they serve to crush and break up the larger pieces of material so that they can subsequently be pulverized by the crushing rollers 6.

Reference numeral 16 in FIG. 4 identifies protective elements which may be of triangular or otherwise configurated cross section, and which serve to relieve the load of the material of the mound 9 resting on the rollers 15 and 6. If necessary or desirable these protective elements 16, which of course extend transversely to the height of the cooling conduit 5 and which may extend in axial parallelism with the rollers 6, 15 or which also may be extending transversely to the axes of the rollers 6, 15, may also be cooled. They may, for instance, be hollow and cooling air or cooling water may be circulated through them in known manner. Evidently, internal cooling may also be supplied for the coarse crushing rollers 15 and for the regular crushing rollers 6 if this is deemed desirable or necessary. Furthermore, it is not necessary for the protecting or reinforcing elements 16 to be of triangular cross section as shown in FIG. 4, but instead the cross section may be circular or of other configuration.

Further improvements, particularly assurance of trouble-free unsupervised most economic cooling operation is provided by the embodiment illustrated in FIG. 5. This embodiment is based on the realization that it is important for the ratio of the upper and lower conduit cross sections to be kept within definite limits, within the range of 1:1.5 and 1:4, with the latter value being preferred. Furthermore, it should be possible to break up particularly large pieces of treated solids, for which purpose it is necessary to readily gain access from the exterior of the cooling conduit.

As shown in FIG. 5, the cooling conduit which is here identified with reference numeral 5a is in its lower portion of a cross section which is either constant or which converges slightly in downward direction. This lower portion is identified with reference designation Fu. The upper portion, which is also of constant cross section or slightly divergent cross section in direction towards the lower portion, is identified with reference designation Fo Intermediate the portions Fo and Fu, connecting them, there is a portion Z of downwardly divergent cross section. By constructing the cooling conduit 5a in this manner we assure that the streams of air flowing upwardly between the crushing rollers 6 are prevented from forming open channels in the material contained in the cooling conduit 5a, because the upwardly convergent cross section of the intermediate portion Z causes the airstreams to converge inwardly. This is desirable because if the airstreams were capable of forming such channels and maintaining them open, uniform cooling of the calcined material in the cooling conduit 5a would be put in doubt.

Reference numeral 18 identifies openings for inspection of the interior of the cooling conduit 5a, and of the material contained therein. In addition, the openings 18 serve to provide access to the interior of the cooling conduit 5a, so that a compressed-air tool 19, an explosive cartridge or another suitable means may be inserted through these openings in order to permit breaking-up of treated solids 17 which are of such size that they cannot be satisfactorily reduced by the crushing rollers 6.

Furthermore, another possibility of effecting more ready breaking-up of large-dimensioned solids 17 is in making some or all of the crushing rollers 6 adjustable in their height, that is making them movable between positions in which they are located higher up or lower in the cooling conduit 5a, as indicated by arrows which are associated with each of the crushing rollers 6. Suitable means for effecting such adjustable mounting are well known and need not be described in detail. It is pointed out, however, that by lifting or lowering one or several of the rollers 6, and in conjunction with the weight of the calcined material resting thereon, a larger-dimensioned solid 17 can be more readily broken up because its position and orientation with reference to the crushing rollers 6 can then be changed.

In many instances it is desirable that the complete installation be as low as possible. This can be achieved, as shown in FIG. 5, by utilizing a belt, plate, bucket, or similar conveyor 20 whose upper run includes an upwardly inclined section as shown so that the funnel-shaped lower end portion shown in FIG. 1, in which the bucket wheel 8 or analogous means is mounted, can be omitted. This conveyor 20 may be utilized in conjunction with a heat sensor Th positioned—in FIG. 5 above the upper run of the conveyor 20—in such a manner as to sense the temperature of the material in the conveyor 20 and to provide an indication of the temperature to an operator.

As the embodiment in FIG. 6 shows, an increase in the heat economy may be obtained by adjusting the volume of air necessary for cooling at constant pressure to the air permeability of the mound of treated material located in the cooling conduit, in such a way that the height of the mound of material decreases with decreasing air permeability. Evidently, if the height of the mound is regulated, then a corresponding alteration of the blower pressure will be necessary for this purpose.

FIGS. 7–9, finally, show that the effect obtained in FIG. 6 may also be achieved in a different manner with the height of the mound being constant. In FIGS. 7–9 the cooling air is introduced by blower 21 from below the crushing rollers 6 and also above the crushing rollers 6. Conduit 7b conveys cooling air underneath the crushing rollers 6 for upward movement as indicated by the arrows. Conduit 7c also communicates with the blower 21 but its outlet end communicates with the cooling conduit 5 within the mound of material 9 to be cooled. It will be seen that its free end portion is upwardly bent and carries a substantially mushroom-shaped baffle 22 with the air impinging upon the underside of the baffle 22 and being deflected as indicated by the curved arrows. In larger units several of the baffles 22, for instance in concentric arrangement, may be provided. A further conduit 7a also communicates with the blower 21 and extends to nozzles or tuyers 23 which are arranged still further upwardly, at the upper end or generally within the region of the downwardly divergent conduit portion Z. The conduits 7a, 7b and 7c are each provided with a regulating flap valve 24 or similar means which may be operated manually or automatically, in the latter case in dependence upon predetermined parameters such as the temperature of the material, the quantity of the material passing through the cooling conduit 5, the pressure or another selected reference parameter.

FIG. 8 is a section taken on the line VIII—VIII of FIG. 7 and illustrates that the nozzles 23 discharge tangentially with reference to the upright axis of the cooling conduit 5, thereby counteracting the tendency of the rising cooling air to move peripherally of the cooling conduit 5. However, as illustrated in the vertical section of FIG. 9, the nozzles may also be located otherwise, such as downwardly inclined, and they may discharge radially or tangentially.

With the embodiment in FIGS. 7 and 8 and their alternative in FIG. 9 the distribution of the cooling air in three zones one above the other provides the possibility to proceed with the least possible air compression and fixed cooling air volume in dependence upon any working conditions which may arise. Of course, separate blowers 21 may be associated with the various conduits 7a, 7b and 7c if desired. Finally, according to a further aspect of the invention the direction of rotation of the crushing rollers 6 may be periodically reversed, or it may be reversed by manual operation as desired at the will of an operator. This prevents the jamming of larger-dimensioned solids between adjacent ones of the crushing rollers 6 which are not at the particular time in which they come in contact with these larger-dimensioned solids, rotating in a sense feeding downwardly with respect to the upright axis of the cooling conduit 5. This provides for smoother operation and counteracts alterations in the distribution of cooling air to the conduits 7a, 7b and 7c insofar as this occurs.

Evidently, the various different features outlined and disclosed above may be used in various different combinations with one another without departing in any way from the scope and intent of the present invention. By resorting to the invention a continuous, automatic, economic and readily regulatable operation of the device according to the present invention is obtained, with the possibility of manual intervention on the occurrence of obstructions, that is if the device encounters larger-dimensioned solids which cannot itself handle.

It will be understood that each of the elements described above, or two or more together, may also find a useful application in other types of constructions, differing from the types described above.

While the invention has been illustrated and described as embodied in a cooling arrangement for the product of rotary furnaces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the following claims.

1. An arrangement of the character described, comprising a furnace for treating flowable solids and having an outlet through which the treated flowable solids issue at elevated temperature; a stationary upright cooling conduit having a lower portion, and an upper portion connected to said furnace and communicating with said outlet of the same for receiving treated flowable solids therefrom, said upper portion having a constriction downwardly spaced from said outlet; intercepting means comprising a plurality of rotatable crushing rollers arranged side-by-side extending transversely of the elongation of said cooling conduit and dividing the same into said upper and lower portions, said intercepting means being operative for intercepting the treated flowable solids so that the same accumulate in said conduit above said intercepting means, and for discharging the intercepted treated solids in downstream directed at a controlled rate; withdrawing means spaced from said intercepting means in downstream direction for receiving discharged treated solids and withdrawing them from said cooling conduit; and supply means directing streams of cooling air upwardly through the accumulated intercepted treated solids from the region between said intercepting means and said withdrawing means, for cooling said solids and maintaining the same in fluidized state at least in the region of said constriction.

2. An arrangement as defined in claim 1, wherein said furnace is a rotary furnace.

3. An arrangement as defined in claim 1, wherein said furnace and said cooling conduit together constitute a structural unit.

4. An arrangement as defined in claim 1, wherein said withdrawing means comprises a bucket wheel.

5. An arrangement as defined in claim 4, and further comprising distributing means for distributing the cooling air at least substantially evenly over the entire cross section of said cooling conduit.

6. An arrangement as defined in claim 1, said upper portion having a cross section which converges towards said lower portion at an angle requisite for maintaining the surface of the accumulated solids in flowable condition.

7. An arrangement as defined in claim 6, wherein the cross section of said upper portion converges with respect to the cross section of said lower portion at a ratio of between substantially 1;1.5 and 1:4.

8. An arrangement as defined in claim 1, wherein different ones of said crushing rollers rotate at different speeds for facilitating discharging of said intercepted treated solids in downstream direction.

9. An arrangement as defined in claim 1, wherein at least some of said crushing rollers are located at levels which are above the level of others of said crushing rollers, in dependence upon the height to which said treated solids are desired to accumulate in said conduit.

10. An arrangement as defined in claim 1, wherein the treated solids accumulate in said conduit in form of a substantially conical mound; and wherein at least some of said crushing rollers are located at levels staggered with respect to their height in dependence upon the cone angle desired for said mound.

11. An arrangement as defined in claim 1, wherein said lower portion diverges in cross section in direction downstream of and away from, said upper portion.

12. An arrangement as defined in claim 1, said supply means directing said streams of air upwardly from locations which are spaced downstream of said crushing rollers by a distance requisite for obtaining initial warming of the cooling air by heat contained in the larger broken solid particles.

13. An arrangement as defined in claim 1, and means for conducting all of said cooling air to said furnace so as to constitute secondary air in the same.

14. An arrangement as defined in claim 1; and further comprising additional supply means for directing cooling air into said cooling conduit at a location different from the first-mentioned supply means.

15. An arrangement as defined in claim 14, wherein cooling air from one of said supply means is supplied to the other of said supply means.

16. An arrangement as defined in claim 1; and suction means communicating with said conduit upwardly of said crushing rollers for withdrawing a portion of said cooling air.

17. An arrangement as defined in claim 1, wherein different ones of said crushing rollers are rotatable at different speeds for thereby adjusting and maintaining the height of the accumulated mound of treated solids.

18. An arrangement as defined in claim 17; and further comprising radiant-energy emitters and radiant-energy receivers located at mutually opposite sides of said conduit in transverse alignment at different levels, for sensing the height of said mound.

19. An arrangement as defined in claim 18, wherein said emitters are isotope radiators.

20. An arrangement as defined in claim 17, wherein the mound of treated solids emits radiant energy; and further comprising a plurality of radiant-energy receivers arranged at different levels of said conduit for sensing the emitted radiant energy of said mound and for thereby sensing the height of the latter.

21. An arrangement as defined in claim 20, wherein said radiant-energy receivers comprise photoconductive cells and amplifiers cooperating with said cells.

22. An arrangement as defined in claim 17; and further comprising a control device associated with each of said crushing rollers for varying the speed of rotation thereof as a function of changes in the height of said mound.

23. An arrangement as defined in claim 17; further comprising a control device associated with each of said crushing rollers operable for varying the speed of rotation thereof, and for sensing changes in the height of said mound; signal-generating means for generating a signal in response to impulses received from the respective control device; manually operable means for actuating said control device to thereby vary the speed of rotation of the associated crushing rollers; and intermittently operating means for intermittently actuating said control devices.

24. An arrangement as defined in claim 1; further comprising coarse-crushing rollers mounted for rotation above said crushing rollers; and protective elements mounted above said coarse-crushing rollers and extending transversely of said conduit.

25. An arrangement as defined in claim 24; and cooling means for cooling said protective elements.

26. An arrangement as defined in claim 24, wherein at least some of said coarse-crushing rollers are mounted for height-adjustment in said conduit.

27. An arrangement as defined in claim 1; and further comprising openings in said conduit for insertion into the latter of auxiliary elements operative for disintegrating large-dimensioned solids.

28. An arrangement as defined in claim 1, said withdrawing means including a conveyor having a run provided with an upwardly inclined section; and thermal-sensing means for sensing the temperature of said conveyor and for indicating the sensed temperature.

29. An arrangement as defined in claim 28, wherein said conveyor is a belt conveyor.

30. An arrangement as defined in claim 28, wherein said conveyor is a bucket conveyor.

31. An arrangement as defined in claim 1, said supply means directing said streams of cooling air upwardly at constant pressure; and wherein said crushing rollers effect alteration in the height of the mound of accumulated treated solids so as to maintain the rate of airflow constant by such alterations.

32. An arrangement as defined in claim 1; and further comprising additional supply means for directing additional cooling air into said conduit above said crushing rollers.

33. An arrangement as defined in claim 32; further comprising at least one substantially mushroom-shaped baffle arranged in said conduit above said crushing rollers; and wherein said additional supply means directs said additional cooling air from below in upward direction against said baffle.

34. An arrangement as defined in claim 33, said conduit comprising an intermediate portion having a cross section which diverges in direction from said upper towards said lower portion; further comprising a plurality of injecting nozzles communicating with the interior of said conduit in the region of said intermediate portion; and wherein said additional supply means also communicates with said injection nozzles for directing further cooling air through said nozzles into said conduit.

35. An arrangement as defined in claim 34, wherein said injection nozzles extend substantially radially with reference to the longitudinal axis of said conduit.

36. An arrangement as defined in claim 34, wherein said injection nozzles extend substantially tangentially with reference to the longitudinal axis of said conduit.

37. An arrangement as defined in claim 34, wherein said nozzles are inclined in downstream direction.

38. An arrangement as defined in claim 34; further comprising a source of cooling air; supply conduits connecting said source with said supply means and with said additional supply means, and connecting said additional supply means with said nozzles; and adjusting means for adjusting the proportions of cooling air flowing through the respective supply conduits.

39. An arrangement as defined in claim 38, said adjusting means being manually operable adjusting means.

40. An arrangement as defined in claim 38, said adjusting means being automatic adjusting means effecting adjusting of the proportions of cooling air flowing through the respective supply conduits as a function of predetermined reference parameters.

41. An arrangement as defined in claim 32; further comprising first and second blower means respectively cooperating with said supply means and said additional supply means for supplying cooling air thereto.

42. An arrangement as defined in claim 1; further comprising reversing means for periodically reversing the direction of rotation of said crushing rollers.

43. An arrangement as defined in claim 1; further comprising manually operable reversing means for reversing the direction of rotation of said crushing rollers at the will of an operator.

* * * * *